Sept. 11, 1934. P. ST. J. HILTON 1,973,071
WINDOW WIPER
Filed April 16, 1932
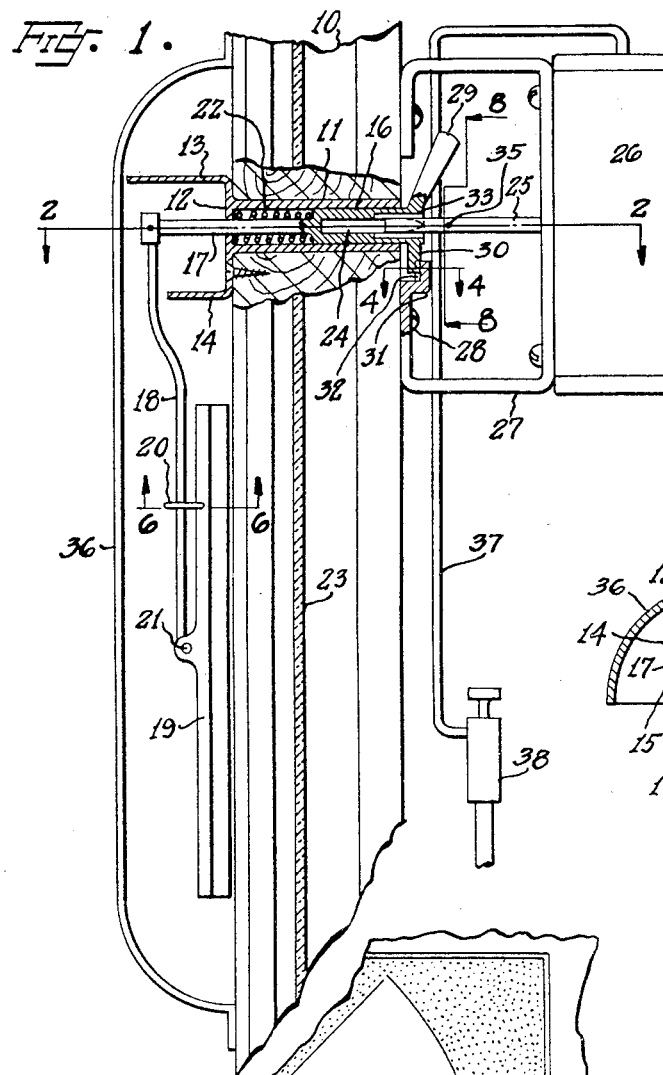
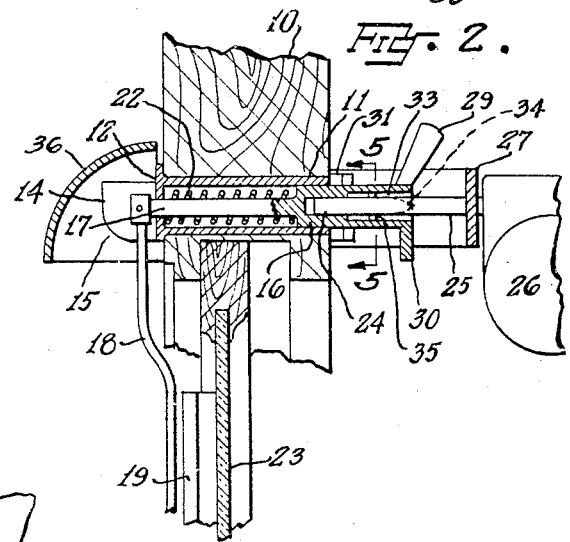
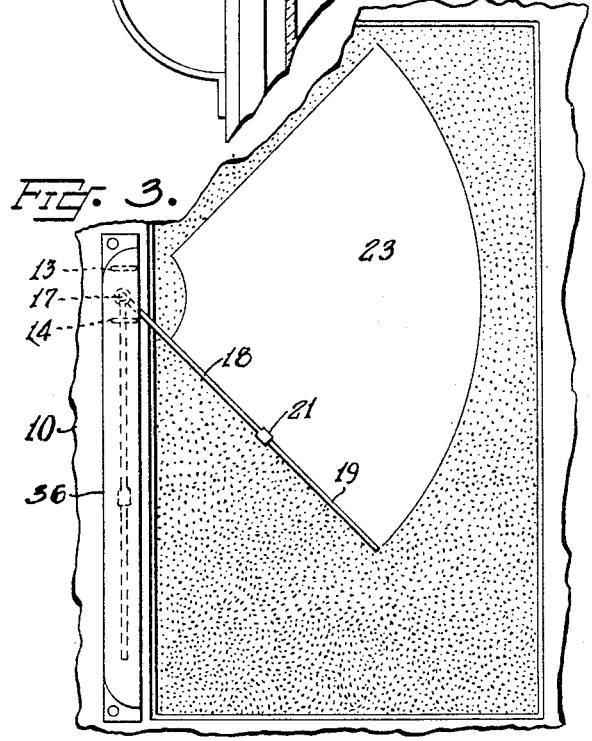
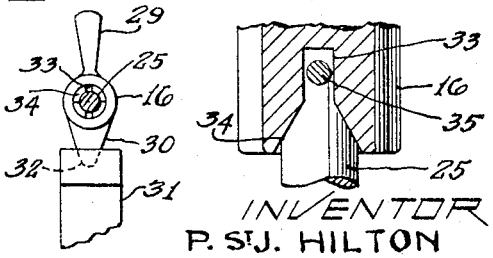
INVENTOR
P. ST J. HILTON
BY E. B. Birkenbeul
ATTORNEY Patented Sept. 11, 1934

1,973,071

UNITED STATES PATENT OFFICE 1,973,071

WINDOW WIPER

Philip St. John Hilton, Portland, Oreg.

Application April 16, 1932, Serial No. 605,665

2 Claims. (Cl. 15—255)

This invention relates generally to window wipers, and particularly to a form of wiper adapted for use on street cars employing the drop type of window.

The main object of this invention is to provide a window wiper of the type referred to which is simple to manufacture, easy to install and requires only a minimum amount of effort on the part of the motorman to place same in operation.

The second object is to so construct the device that the wiper may be brought into engagement with the glass when the window is raised or can be moved out of engagement therewith before the window is lowered.

These, and other objects, will become more apparent from the specification following as illustrated in the accompanying drawing, in which:

Fig. 1 is a vertical section through the motorman's window of a street car showing the device in elevation with a portion thereof broken away in vertical section and showing the wiper out of engagement with the glass.

Fig. 2 is a fragmentary horizontal section through the device taken along the line 2—2 in Fig. 1 showing the wiper in engagement with the glass.

Fig. 3 is a front elevation of the device from the exterior of the car window.

Fig. 4 is a section taken along the line 4—4 in Fig. 1.

Fig. 5 is a section taken along the line 5—5 in Fig. 2.

Fig. 6 is a section taken along the line 6—6 in Fig. 1.

Fig. 7 is a section taken along the line 7—7 in Fig. 5.

Fig. 8 is a section taken along the line 8—8 in Fig. 1.

Similar numbers of reference refer to similar parts throughout the several views.

Referring in detail to the drawing, there is shown the upright frame post 10 of a street car window behind which the motorman stands when operating the car. Through the post 10 extends a tubular sleeve 11 whose outer end 12 is closed and is extended upwardly and downwardly and then out-turned to form the upper stop 13 and the lower stop 14. The stop 14 is preferably rounded on one corner 15 (as shown in Fig. 2).

Within the tubular sleeve 11 is journalled a rock shaft 16 provided with a reduced portion 17 which passes through the end 12. The portion 17 carries on its outer end a wiper arm 18 to whose swinging end is hingedly attached a wiper element 19. It is desirable to limit the hinging movement of the element 19 by means of a link 20, or in any other convenient manner such as extending the arm 18 past the pivot point 21 and utilizing the extended arm as a stop.

On the reduced portion 17 between the end 12 and the shaft 16 is a spring 22 whose purpose it is to urge the wiper 19 toward the glass 23 of the motorman's window.

Within the shaft 16 is a hole 24 into which projects a rock shaft 25 of an air motor 26, preferably of the type employing compressed air and which is now in common use. The motor 26 is carried by a suitable bracket 27 which is secured to the post 10 by means of the screws 28.

The rock shaft 16 carries on its outer end a hand lever 29 and a lug 30, which latter is capable of engaging the latch 31 and holding the wiper 19 in an inoperative position (as shown in Fig. 1) or be disengaged therefrom by first pushing the lever 29 toward the post 10 which will lift the lug 30 out of the recess 32 in the latch 31 and permit the shaft 16 to slide outwardly toward the operator, carrying with it the wiper 19 and permitting it to come into engagement with the glass 23 (as shown in Fig. 2).

The hole 24 is provided with keyways 33 the outer ends of which are widened to form the angular faces 34 which expedite the entrance of the pin 35 into the keyways 33. The pin 35 is secured in the rock shaft 25 and projects through each end thereof.

On the outside of the post 10 is mounted a guard 36 whose purpose it is to protect the wiping element 19 and the arm 18 from becoming fouled with the trolley rope which usually hangs in front of the motorman's window.

Air is supplied to the motor 26 by a source of power through the tubing 37 under the control of the valve 38.

The operation of the device is as follows: Assuming that the window is in a closed position and it is desired to operate the wiper the motorman merely pushes the lever 29 forwardly a slight distance and then rotates it leaving the lug 30 out of its latched position and permitting the wiper 19 to engage the glass 23. He then opens the valve 38 or its equivalent which causes a rocking movement to take place at the shaft 25, and since the pin 35 is within the keyways 33 this rocking motion is imparted to the shaft 16.

If the operator merely desires to stop the window wiper all that he has to do is to close the valve 38, but should he desire to open the window he first pushes the lever 29 forwardly and rotates it toward the position shown in Fig. 1 in which the wiper 19 is not only disengaged from the glass 23 but is also stored away within the guard 36. The purpose of widening the ends of the keyways 33 is of course to expedite the entrance of the pin 35 thereinto, as previously suggested.

The purpose of the stop 13 is to prevent an excessive upward movement of the arm 18 at any time—that is, it cannot travel higher than the uppermost position for wiping the glass either when touching the glass or when in an outward position—that is, outside of the frame 10.

The purpose of the stop 14 is to prevent an excessive downward movement of the arm 18 when the wiper 19 is contacting the glass 23, although permitting the arm 18 to move to a vertical position (as shown in Fig. 1), when the wiper is moved away from the glass.

I claim:

1. A wiper for streetcar windows of the drop type comprising a prime mover adapted to be mounted behind the upright portion of a car window frame and having a horizontal shaft projecting into said frame, a rock shaft slidably and rockably mounted within said frame and extending outside of the frame and having a jaw clutch on its inner end for engaging a clutch part on the outer end of said drive shaft, a spring for slidably urging said rock shaft inwardly to a clutch engaging position, a latch for holding said rock shaft outwardly in a clutch disengaging position, a handle on said rock shaft for moving said rock shaft manually, an arm on the outer end of said rock shaft, a wiper blade pivotally attached to the swinging end of said arm and being in contact with the window glass when the rock shaft is in its clutch engaging position, and out of contact with the glass a sufficient distance to clear the frame when the rock shaft is latched in its clutch disengaging position, a stop on said frame for preventing excessive upward movement of said arm at all times, and a second stop on said frame for limiting the downward movement of said blade while it is contacting said glass, but permitting excessive downward movement of the blade when the blade is moved away from the glass.

2. A wiper such as described in claim 1, in combination with means for limiting the relative movement between the wiper blade and the arm to which it is attached.

PHILIP ST. JOHN HILTON.